United States Patent [19]

Hoshino et al.

[11] 4,213,634
[45] Jul. 22, 1980

[54] CONSTRUCTION OF STITCHING PORTIONS OF GAS BAGS

[75] Inventors: Tadayoshi Hoshino, Okazakishi; Yoichi Sudo, Toyotashi, both of Japan

[73] Assignee: Toyota Jidosha Kogyo Kabushiki Kaisha, Aichi, Japan

[21] Appl. No.: 9,680

[22] Filed: Feb. 5, 1979

[30] Foreign Application Priority Data

Feb. 6, 1978 [JP] Japan ............................ 53/012644

[51] Int. Cl.² .................................................. B60R 21/08
[52] U.S. Cl. ........................................ 280/728; 150/1
[58] Field of Search ............... 280/728, 729, 730, 736, 280/743; 9/2 A, 11 A, 310 F; 114/103, 108; 112/158 R, 158 C, 158 E; 244/145; 150/1

[56] References Cited

U.S. PATENT DOCUMENTS

| 3,807,754 | 4/1974 | Rodenbach et al. ............... 280/743 |
| 3,879,057 | 4/1975 | Kawashima et al. ............... 280/743 |
| 4,006,918 | 2/1977 | MacFarland .......................... 280/729 |

Primary Examiner—John J. Love
Assistant Examiner—Michael Mar
Attorney, Agent, or Firm—Browdy and Neimark

[57] ABSTRACT

Gas bags for absorbing emergency shocks exerted on automobile occupants in case of collisions, and particularly gas bags made of fabric, are so constructed that the stitched portions will not be torn apart by the inflating pressure of an instantly produced inflating gas. The stitching portions of the gas bags are so constructed that a plurality rows of seams of stitching yarns arrayed along the margin are coarsened toward the outer side such that the tensile load instantaneously exerted on the stitching portions is uniformly dispersed.

8 Claims, 4 Drawing Figures

CONSTRUCTION OF STITCHING PORTIONS OF GAS BAGS

FIELD OF INVENTION

The present invention relates to safety and, more particularly, to safety gas bags used to cushion automobile occupants in the case of collision.

BACKGROUND OF THE INVENTION

As is well known, great effort has been expended in recent years to improve the safety performance of vehicles such as automobiles; as a result, a variety of technical measures have been devised, developed and put into practical use. Among them, gas bag inflation systems have been developed as a very important means for protecting the occupants of motor vehicles from violent shocks in case of collision with other vehicles or stationary objects such as walls. Now, a variety of improved gas bags and their peripheral arts have been devised.

However, due to the requirements of manufacture, materials and manufacturing costs, the gas bags heretofore used have usually been produced by cutting into prescribed sizes a plain-woven fabric that serves as a substrate fabric, superposing the cut fabrics at their margins, and stitching the superposed portions in a plurality of rows along the margins.

That is, according to the conventional art, the cut base fabrics 1, 1 were superposed at preselected margins 2, 2 as shown in FIG. 1 and FIG. 2, and superposed portions 3 were stitched into a plurality of rows of seams 4a, 4b, 4c, 4d,—using stitching yarns 5, 5,—by means of a sewing machine or any other suitable means. Stitched portions of the fabrics usually exhibit a tensile strength which is relatively smaller than that of the base fabric; therefore, the seams are provided in a plurality of rows to cope with the decrease in strength.

According to the aforementioned conventional gas bags, the seams 4a, 4b, 4c, 4d, were stitched maintaining pitches Pa, Pb, Pc, Pd in a relation $Pa=Pb=Pc=Pd$, i.e. the lengths of the stitches in each row 4a, 4b, 4c, 4d were equal; the seams were simply arrayed spaced laterally and repetitively in order to avoid the decrease in tensile strength.

The mode of breakage at the stitching portions can generally be classified into three types depending upon the density of yarns of the base fabric at the stitching portions, stitch, strength of stitching yarns, and the strength of the yarns forming the base fabric:

(i) The stitching yarn breaks if its strength is less than that of the yarns forming the base fabric between neighboring stitches;

(ii) The yarns forming the base fabric break if the strength is in an opposite relation to that of (i) above, i.e., the base fabric breaks if its yarns have less strength than the stitching yarn; and (iii) The yarns of the fabric at the stitching portion are loosened and removed if the above said strengths are balanced and a great tensile load is applied to the base fabric.

With gas bags, since the base fabric was cut into a prescribed size as mentioned above, and the cut pieces were stitched together, it was accepted practice to rely on the aforementioned situation (i). In other words, the theoretical background for avoiding tearing of the base fabric of gas bag when the gas was injected to inflate the bag, was based on the aforementioned plurality rows of seams 4a, 4b, 4c and 4d, using stitching yarn weaker than the fabric yarn.

When the seams were stitched maintaining an equal pitch as represented by $Pa=Pb=Pc=Pd$, however, the first situation (i) developed due to complicated competitive conditions that will be mentioned later. In this case, a maximum of tensile load was first exerted on the outermost seams 4a and 4d, causing the seams 4a and 4d to be broken. Accordingly, the tensile load was not significantly attenuated and instantaneously thereafter an almost equivalent load was exerted on the inner seams 4b and 4c, causing the seams 4b and 4c also to be broken. Consequently, the gas bags often failed to exhibit their functions just like when the bag was stitched using a single seam.

In order to function properly to cushion the passengers from the collision, the bag system must have a rate of gas inflation of about 1/1.000 to 1/10.000 seconds depending upon the conditions, and at this rate the tensile load is very great.

When the event of situation (ii) mentioned above is developed depending upon the conditions, the base fabrics 1, 1 are torn apart at the stitching portion 3, permitting the inflated gas to be injected into the room from the torn-apart portions and spoiling the function of the bag for absorbing shocks.

SUMMARY OF INVENTION

A primary object of the present invention is to solve the problems inherent in the stitching portions of gas bags such as produced according to the aforementioned prior art.

Another object of the present invention is to provide for construction of stitching portions of excellent gas bags manufactured by taking into consideration the physiochemical properties of the gas bags in a folded state, rate of gas inflation, tensile speed and strength at the stitched portions of the base fabrics, and which are so stitched that the pitches of the seams located relatively on the outer side among a plurality rows of seams are set to be greater than the pitches of the inner seams such that the gas bags will reliably exhibit their functions.

The present invention is based on a principle that when a folded gas bag is instantaneously inflated at a high speed as a result of the collision of a vehicle such as automobile, the resistance to failure or tearing of the fabric near the outer seams is relatively increased if the pitch of a plurality of seams in the superposed margins of the fabrics is increased toward the outer side, i.e., owing to the fact that the ratio of the primary load exerted on the outer seams is decreased such that the stitch yarns are not broken and the base fabric is not broken, either, and further the secondary tensile load is exerted on the inner seams, whereby the tensile load is uniformly exerted on all of the stitches permitting the gas bag to be inflated without causing the stitch yarns or the base fabric to be broken, and eventually making it possible to reliably absorb the shocks.

For a better understanding of the invention, as well as the above and other objects and the nature and advantages of the instant invention, a possible embodiment thereof will now be described with reference to the attached drawings, it being understood that this embodiment is merely exemplary and not limitative.

DETAILED DESCRIPTION OF THE PREFERRED EMBODIMENT

Figure 1:
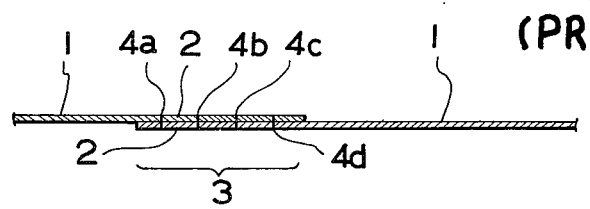
FIG. 1 is a vertical cross-sectional view illustrating the construction of stitching portion of a gas bag according to the prior art.
Figure 2:
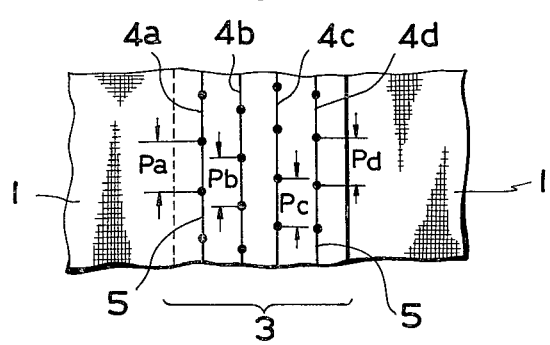
FIG. 2 is a plan view of FIG. 1.

An embodiment is illustrated below with reference to the principle of the present invention.

As mentioned above, the gas bags for enhancing the safety of the passengers in case of an automobile collision are produced by cutting a base fabric into a plurality of pieces and stitching them together at the stitching margins. Moreover, to cope with the occurrence of emergency events, the gas bags are folded in a predetermined manner, connected to a gas generator and accomodated in a predetermined position. Furthermore, so that the gas bags can be instantaneously and smoothly inflated in the event of collision, such gas bags are stored in a usually inaccessible place so that they are not touched by the occupants, except for regular maintenance, and are always subjected to such varying physiochemical conditions as temperature and humidity. Further, the rate of instantaneous gas inflation in an event of rapid impact such as of collision may often be very great.

With reference to the strength of the bags under wet conditions, it is generally regarded that the strength of the base fabric increases with the amount of water content it has absorbed. The strength, on the other hand, tends to decrease with the increase in temperature. The impact tear strength can be tested by a pendulum testing method specified by the Japanese Industrial Standards, JIS L 1006, and it has been known that the tensile strength usually increases with the increase in tension speed.

The strength may of course differ to some extent depending upon the fibrous conditions of the yarns constituting the base fabric even under the aforesaid humidity conditions and temperature conditions. However, if the worst conditions for the gas bags folded in a predetermined shape are taken into consideration, i.e., under dry conditions in summer when the tensile strength decreases, are taken into consideration in combination with the change in tensile strength in an event of impact, the tensile strength of the base fabric greatly decreases as compared with the strength that will be exhibited under the aforementioned two optimum conditions, i.e., as compared with the strength that will be exhibited in snowy time of winter season.

Therefore, in order to avoid the breakage of situation (ii) above, i.e., to avoid the breakage of the base fabric under the conditions in which the tensile strength of the base fabric decreases, the tensile load exerted on the stitch yarns should be decreased. For this purpose, the load should be dispersed; i.e., the tensile load exerted on the outer seams should be partly carried by the inner seams. To disperse the load, the pitches among the outer seams should be relatively coarse and the pitches among the inner seams should be relatively fine.

When the tensile strength of the base fabric is increased under the aforesaid temperature and humidity conditions owing to the abovementioned arrangement of seams in the lateral directions, the phenomenon mentioned in situation (i) above tends to develop. However, since the tensile load is uniformly dispersed on the stitch yarns of all of the seams, the stitch yarns do not break.

Further, as mentioned above, the rate of gas inflation in the gas bag is very fast with respect to the base fabric, causing the tensile strength of the base fabric to be reinforced. Besides, the seams stitched maintaining a coarse pitch toward the outer side and a fine pitch toward the inner side to cope with the problem of situation (i) mentioned earlier, uniformly carry the tensile load, allowing the strength of the stitch yarns of each of the seams to be apparently increased thereby eliminating the probability of stitch yarn breakage.

Thus, by stitching a plurality rows of seams maintaining coarse pitches toward the outer side and fine pitches toward the inner side, the base fabric and stitch yarns are not broken.

Figure 3:
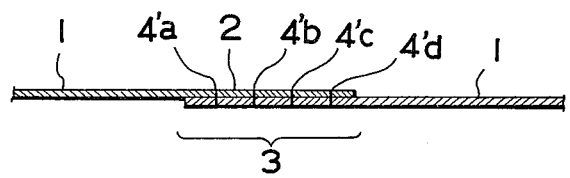
FIG. 3 is a vertical cross-sectional view illustrating an embodiment according to the present invention.
Figure 4:
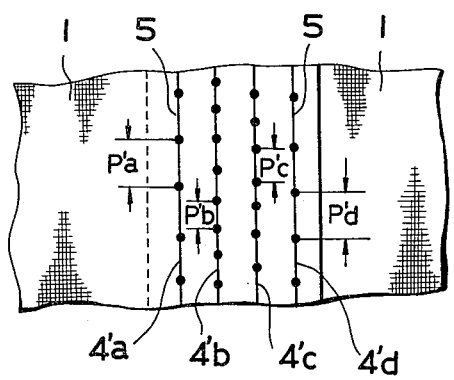
FIG. 4 is a plan view of FIG. 3.

Therefore, according to the present invention as shown by the embodiment of FIGS. 3 and 4, the base fabrics 1, 1 are superposed at the stitch margins 2, 2 where four rows of seams $4'a$, $4'b$, $4'c$ and $4'd$ are formed by a suitable means such as sewing machine along the margin 2, the pitches being so maintained as represented by $P'a = P'd > P'b = P'c$. Here, the pitches $P'a = P'd$ and $P'b = P'c$ will be suitably selected based on the calculations and experiments.

In an event of collision of an automobile, the gas bag constructed as described above will be instantly inflated. The seams of the thus constructed bag will not break even under the competitive weakening conditions caused by the aforesaid temperature and humidity; the gas bags absorb the shocks as designed and prevent the occupants from being smashed into the steering wheel or the dashboard.

The number of seams need not be limited to four rows only, as three or more than four may be used; and the pitches can be suitably selected. The vehicle to which are applied the bags of the present invention need not be limited to the automobiles, either.

According to the present invention mentioned in the foregoing, the base fabric of a predetermined size is cut into pieces, the cut pieces are superposed at their stitch margins and stitched to form a plurality of rows of seams along the stitch margins wherein the pitches among the plurality of laterally spaced rows of seams are made to be relatively coarse toward the outer side and fine toward the inner side. Therefore, despite the change in tensile strength of the base fabric under any temperature and humidity conditions in the vehicle in which the gas bags are installed, and further despite the change in tensile strength due to high tension speed created by the inflating gas, the tensile load is uniformly simultaneously dispersed among the stitch yarns of all the seams. Accordingly, the stitch yarns and the base fabric are not broken, whereby the gas bags are perfectly and instantly inflated to receive thereagainst the occupants who will be thrown that way due to their forward inertia, the bags thereby absorbing the shocks and safely exhibiting the desired cushioning function.

Further, since the pitches among the coarse and fine stitches can be suitably selected, the manufacturer can produce the gas bags in nearly the same manner as the conventional art.

It will be obvious to those skilled in the art that various changes may be made without departing from the scope of the invention and the invention is not to be considered limited to what is shown in the drawings and described in the specification.

What is claimed is:

1. In an inflatable gas safety bag system for use in the protection of passengers in motor vehicles in the event of collision, including a gas bag and means for rapidly inflating said bag with a gas upon collision, the improvement comprising the gas bag being formed of overlapping fabric pieces sewn together along stitch margins with a plurality of laterally spaced rows of stitches, the improvement comprising means to substantially uniformly distribute tensile load, on inflation of said bag, among said spaced rows of stitches, said means comprising at least three said rows of stitches wherein the middle of said rows of stitches has a relatively fine stitch pitch and the outer of said rows of stitches have relatively coarse stitch pitches.

2. A bag in accordance with claim 1, wherein the yarns from which said stitches are formed are no greater in strength than the strength of the yarns forming said fabric pieces.

3. A bag in accordance with claim 1, wherein the seams are so stitched as will not overlap as far as possible when viewed from a direction at right angles to the stitch yarns.

4. A bag in accordance with claim 1, wherein there are four said rows of stitches.

5. A bag in accordance with claim 4, wherein the stitch pitches of the two middle rows are essentially equal, and the stitch pitches of the two outer rows are essentially equal.

6. A bag in accordance with claim 1, wherein there are more than four said rows of stitches.

7. A bag in accordance with claim 6, wherein there are an even number of said rows of stitches.

8. A bag in accordance with claim 6, wherein from the middle-most of said rows of stitches to the outermost rows of stitches the pitch becomes progressively greater.

* * * * *